(12) United States Patent
Hideshiro

(10) Patent No.: US 8,009,029 B2
(45) Date of Patent: Aug. 30, 2011

(54) MOVABLE DISPLAY DEVICE

(75) Inventor: Fujie Hideshiro, Chiba (JP)

(73) Assignees: Hyundai Motor Company, Seoul (KR); Kia Motors Corporation, Seoul (KR); Hyundai Motor Japan R&D Center, Inc., Chiba (JP)

( * ) Notice: Subject to any disclaimer, the term of this patent is extended or adjusted under 35 U.S.C. 154(b) by 342 days.

(21) Appl. No.: 12/268,536

(22) Filed: Nov. 11, 2008

(65) Prior Publication Data

US 2009/0128317 A1    May 21, 2009

(30) Foreign Application Priority Data

Nov. 15, 2007   (JP) .................................. 2007-297157

(51) Int. Cl.
*B60Q 1/00*   (2006.01)

(52) U.S. Cl. ..................... 340/459; 340/425.5; 40/593

(58) Field of Classification Search .................. 340/459, 340/425.5, 576; 40/593, 606.16; 296/24.34
See application file for complete search history.

(56) References Cited

U.S. PATENT DOCUMENTS

| 6,012,785 | A * | 1/2000 | Kawasaki | 312/29 |
| 6,049,288 | A * | 4/2000 | Kawasaki | 340/815.4 |
| 7,337,566 | B2 * | 3/2008 | Inayoshi | 40/593 |
| 2009/0128307 | A1 * | 5/2009 | Hentsch et al. | 340/425.5 |

FOREIGN PATENT DOCUMENTS

| JP | 05-147456 | 6/1993 |
| JP | 08-011582 | 1/1996 |
| JP | 2002-166748 | 6/2002 |
| KR | 2003-0087481 | 11/2003 |

* cited by examiner

*Primary Examiner* — Toan N Pham
(74) *Attorney, Agent, or Firm* — Edwards Angell Palmer & Dodge LLP; Peter F. Corless

(57) ABSTRACT

The present invention provides a movable display device which has a high awareness of a display content while a sight line moving angle between a sight line connecting a driver's eye to display means and a sight line connecting the driver's eye to a target is small, thereby alleviating the driver's fatigue.

14 Claims, 7 Drawing Sheets

[A]

[B]

MOVABLE DISPLAY DEVICE

CROSS-REFERENCE TO RELATED APPLICATION

This application claims the benefit under 35 U.S.C. §119 (a) of Japanese Patent Application No. 2007-297157 filed on Nov. 15, 2007, the entire contents of which are incorporated herein by reference.

BACKGROUND OF THE INVENTION (a) Field of the Invention

The present invention relates to a display device for vehicles, aircrafts or the like. More particularly, the present invention relates to a movable display device which allows the installation position of display means and the angle of a display surface to be varied depending on the driving condition of a vehicle.

(b) Background Art

A display device for a vehicle serves to inform a driver of vehicle conditions that are important for driving the vehicle, such as, but not limited to, vehicle velocity, vehicle driving distance, the amount of fuel available, revolution per minute (rpm) of the engine, the temperature of cooling water, warning indication, etc.

Accordingly, the driver operates a vehicle while checking various circumstances such as, but not limited to, other vehicles, obstacles, traffic lights, traffic signs and so forth at the outside of a vehicle body with his or her naked eyes, and also simultaneously perceives the vehicle situations displayed on display means mounted at the interior of the vehicle.

FIG. 8 is a schematic diagram showing a sight line moving angle between a sight line connecting a driver's eye to display means and a sight line connecting the driver's eye to a target when viewed from a side of the vehicle wherein the right of the drawing is the advance direction of the vehicle.

Conventionally, a display means 4 is often embedded at a side of a dashboard in front of a driver (hereinafter, referred to as 'initial position 41a'). When a vehicle drives at a relatively low speed, the driver's 30 sight generally remains at a position close to the vehicle. Thus, the fact that the display means 4 is positioned at the initial position 41a does not matter. In certain cases, when the vehicle drives at a high speed, the driver's sight is generally fixed to a target that is located far from the driver's vehicle. Thus, a sight angle to the target, namely a sight line 31 from the driver's eye 31 to the target substantially closes to a horizontal line. Thus, a sight line moving angle 33 between a sight line 32 from the driver's eye 31 to the display means 4 and a sight line 31 from the driver's eye 31 to the target is suitably increased.

Even though displayed information, which the driver frequently checks, is varied depending on respective driving situations, the conventional instrument panel merely displays preconfigured information. Such preconfigured display is not suitable for effectively reflecting a current driving situation.

Accordingly, if there is an increase in the time taken for a driver 30 to revert his or her eyes to the display means 4 from the front of the vehicle body, so as to watch the display means 4, the possibility of an accident increases. Accordingly, the driver 30 must watch the display means 4 as rapidly as possible so as to shorten the time for him or her to avert his or her eyes. Accordingly, because the angle of view of the human eye in a vertical direction is narrow, an increase in the sight line moving angle 33 gives a mental tension to the driver 30 and increases a psychological burden of the driver, which contributes to the fatigue of the driver 30.

Therefore, the configuration of the position, angle, display content and display screen of the display means of the conventional display device is not satisfactory in terms of alleviation of the fatigue.

As Japanese Patent Laid-Open Publication No. 2002-166748 is related to a method in which a display region for the entire display screen is changed depending on the forward and rearward position of a seat where the driver sits, or to the height of the driver's eyes, so as to allow the display region to be displayed in a size of the screen which can be easily watched by the driver. However, it remains that the position of the entire display screen is not changed, but a separate small display portion is formed at an upper portion of the screen.

Japanese Patent Laid-Open Publication Nos. 1-123731 and 5-147456 are related to methods in which the display content of a display unit mounted at a dashboard is reflected from a reflecting lens installed at an upper portion of the dashboard to create a virtual image so as to reduce the movement of the driver's line of sight, suitably by means of a head-up display (HUD) which is configured to project the virtual image onto a front windshield glass to allow the virtual image to be located ahead of the driver's eyes while being overlapped with views of the front of the vehicle. Accordingly, the projected virtual image is displayed on the front windshield glass while being overlapped with the front views of the vehicle, which makes it difficult for the driver to discern the virtual image.

Moreover, if a semi-transmission type liquid crystal is used for performing a display function by reflection of external light, transmittance of a backlight is suitably low, thereby resulting in a degradation in color reproducibility as compared to the transmission type liquid crystal. Accordingly, the above problem still occurs although a special film is attached to a panel.

The information disclosed in this Background of the Invention section is only for enhancement of understanding of the background of the invention and should not be taken as an acknowledgment or any form of suggestion that this information forms the prior art that is already known to a person skilled in that art.

SUMMARY OF THE INVENTION

The present invention provides a movable display device which has a high awareness of display content wherein the sight line moving angle between a sight line connecting a drivers eye to display means and the sight line connecting the drivers eye to a target is small, thereby alleviating the driver's fatigue.

In preferred embodiments, the present invention provides a movable display device comprising display means for displaying a driving condition of a vehicle, vehicle condition-collecting means for collecting information regarding the driving condition of the vehicle and control means for controlling the display means, wherein the display means is movable in a horizontal direction from a side of a dashboard to a center of the vehicle, in a perspective direction from the dashboard side to a position just below a front windshield glass, and in a vertical direction from the dashboard side to a position above the dashboard, and the position of the display means is determined by the control means.

The display device of a vehicle and the like of the present invention is preferable configured in a movable fashion. Preferably, the movable display device of the present invention preferably includes display means 4 for suitably displaying a driving condition of a vehicle, vehicle condition-collecting means 3 for suitably collecting information regarding the driving condition of the vehicle and control means 5 for suitably controlling the display means. In this case, the display means 4 is movable in a substantially horizontal direction preferably from a side of a dashboard 45 to a center of the vehicle, a perspective direction preferably from the dashboard side 45 to a position just below a front windshield glass 44, and a substantially vertical direction preferably from the dashboard side 45 to a position above the dashboard, and the position of the display means 4 is suitably determined by the control means 5.

In a further preferred embodiment, the control means 5 detects the driving speed of the vehicle by suitably dividing the driving speed of the vehicle into a plurality of speed levels, determines the position of the display means according to a preset control pattern corresponding to each speed level, and controls the display means to be moved.

In another preferred embodiment, the control pattern is set in such a fashion that the display means is preferably stepwise moved from the dashboard side 45 to a position suitably above the dashboard in front of the vehicle body 10 corresponding to an increase in the driving speed of the vehicle.

In still another preferred embodiment, the display means 4 is suitably configured such that the rotation angle about a substantially vertical axis of the display means and the rotation angle about a substantially horizontal axis of the display means that are preferably directly oriented toward an advance direction are suitably changeable, and the rotation angle about a substantially vertical axis of the display means 4 and the rotation angle about a substantially horizontal axis of the display means that are preferably directly oriented toward an advance direction are suitably set by the control means 5.

In yet another preferred embodiment, the vehicle condition-collecting means 3 preferably detects a driver's head 54 suitably through a position sensor mounted at a motor-driven driver's seat (power seat 60), the control means 5 controls the rotation angle about a substantially vertical axis of the display means after movement and the rotation angle about a substantially horizontal axis of the display means 41 directly oriented toward an advance direction to be changed in such a fashion as to be preferably oriented toward the driver's head 54.

In still yet another preferred embodiment, the vehicle condition-collecting means 3 preferably further comprises means for detecting one or more of the altitude, the longitude and the altitude, the angle of the driving direction and the tilt of the vehicle 10, and whether the solar light is incident to the driver's head, and the control means 5 preferably integrates vehicle position information which can be obtained by one or more of the altitude, the longitude and the altitude, the angle of the driving direction and the tilt of the vehicle 10, altitude and azimuth information of the sun which can be obtained from one or more of the celestial movement table, information on whether the solar light is incident to the driver's head, information on the position of the display means 42 after angle change, and information on the rotation angle about a substantially vertical axis of the display means and the rotation angle about a substantially horizontal axis of the display means directly oriented toward an advance direction so as to detect the angle of the reflected light 56 of the solar beam from the display means 42 after angle change to change the rotation angle about a substantially vertical axis of the display means 42 after angle change and the rotation angle about a substantially horizontal axis of the display means directly oriented toward an advance direction so that the reflected light 56 is incident to a position beyond a range of the driver's head 54.

In a further preferred embodiment, the display means 4 is preferably a mechanical meter or a liquid crystal display.

In another further preferred embodiment, the display means is preferably configured such that the display content and/or the display screen configuration can be suitably changed within a display-enabling region.

In still another further preferred embodiment, the display content and/or the display screen configuration of the display means 4 is suitably controlled by the control means 5.

In yet another further preferred embodiment, at least one selected from, but not only limited to, the size, the color tone and the luminance (contrast) of the display content and/or the display screen configuration of the display means is preferably changeable manually and independently.

In still yet another further preferred embodiment, the display means is manually movable to an arbitrary position within a movement-enabling range.

Other aspects of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given herein below by way of illustration only, and thus are not limitative of the present invention, and wherein.

Figure 1:
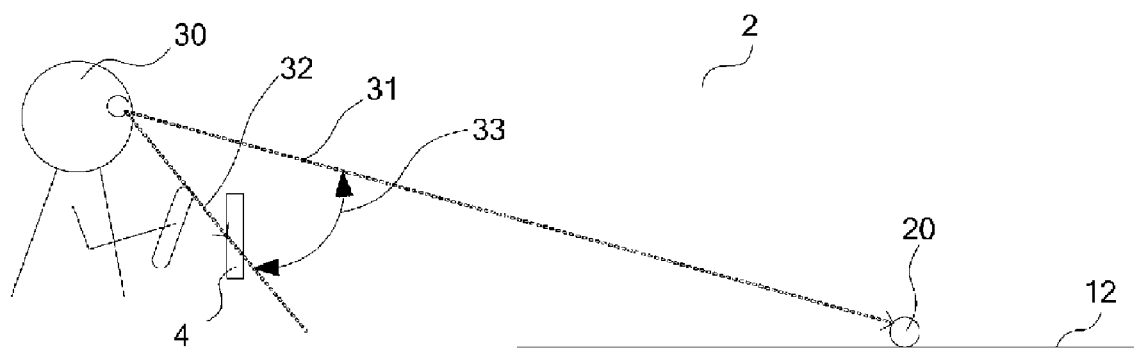
FIG. 1 is a schematic diagram illustrating the relationship between a position of display means and a sight line moving angle according to the present invention.
Figure 1:
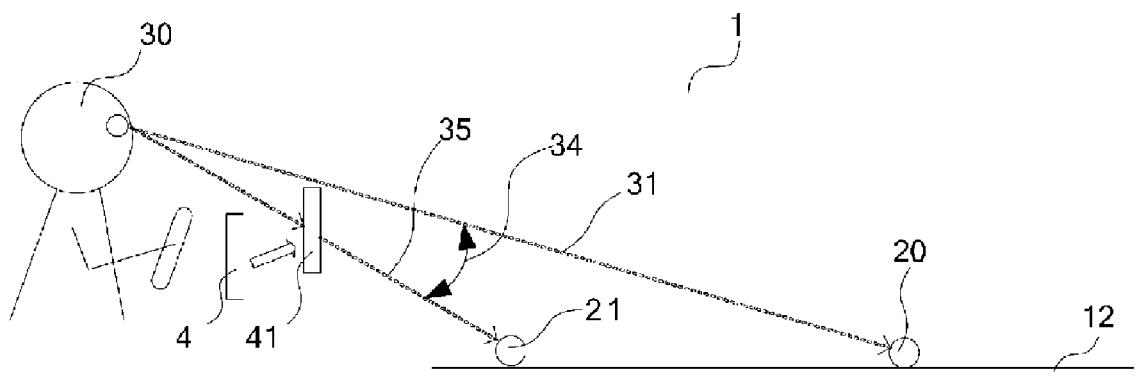

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

In a first aspect, the invention features a movable display device comprising display means for displaying a driving condition of a vehicle, vehicle condition-collecting means for collecting information regarding the driving condition of the vehicle and control means for controlling the display means.

In one embodiment, the display means is movable in a horizontal direction, in a perspective direction, or in a vertical direction. In a related embodiment, the display means is movable in a horizontal direction from a side of a dashboard to a center of the vehicle, in a perspective direction from the dashboard side to a position just below a front windshield glass, or in a vertical direction from the dashboard side to a position above the dashboard, the position of the display means being configured by the control means.

The invention also featured a motor vehicle comprising the movable display device as described herein.

Reference will now be made in detail to the preferred embodiments of the present invention, examples of which are illustrated in the drawings attached hereinafter, wherein like reference numerals refer to like elements throughout. The embodiments are described below so as to explain the present invention by referring to the figures.

The typical description or the redundant description of a conventional technique and an identical portion can be omitted. The above and other objects, features and advantages of the present invention will be more understood from the following detailed description of the preferred embodiments of the invention.

Preferred embodiments of according to the present invention will be described hereinafter in detail with reference to the accompanying drawings.

Embodiment

In a first embodiment, the invention features a position control of display means.

The position control of the display means 4 according to preferred embodiments of the invention will be described in detail hereinafter with reference to exemplary FIG. 1.

FIG. 1 is a schematic diagram illustrating the preferred relationship between a position of display means and a sight line moving angle according to certain preferred embodiments of the present invention, suitably when viewed from a side of the vehicle wherein the right of the drawing is the advance direction of the vehicle.

Referring to FIG. 1(A), in a preferred initial position 41a of the display means 4, the display means 4 is preferably located at a dashboard below a front windshield glass 44 preferably in front of a driver's seat in such a fashion as to be suitably oriented toward a driver 30. In this case, the display position and display content of the display means are preferably fixed.

In certain embodiments, when the vehicle is driven at a suitably relatively low speed on a road having a considerable number of obstacles, the driver 30 suitably drives the vehicle while viewing his or her surroundings, for example, his or her long range surroundings, and also including the area in the vicinity of a vehicle body. Thus, in certain embodiments, the initial position 41a of the display means 4 does not matter.

However, in further embodiments of the invention, when the vehicle is driven at high speed on a highway or the like having, for example, less obstacles in the surroundings, the driver suitably focuses his or her eyes on a far target, and hence a sight line 31 connecting the driver's eye to the target is fixed to a central portion of a substantially horizontal direction. Accordingly, in further embodiments, when the driver preferably averts his or her eyes to the display means 4 installed at an initial position, a sight line moving angle 33, i.e., an angle between a sight line 32 from the driver's eye 31 to the display means 4 and the sight line 31 from the driver's eye 31 to the target is suitably large.

The present invention features, certain embodiments, that the display means 4 installed at the initial position 41a is preferably moved upwardly and simultaneously forwardly preferably depending on a driving position so as to suitably decrease the sight line moving angle 33 of the driver 30.

Referring to FIG. 1(B), in preferred embodiments, the display means 4 is preferably moved from its initial position 41a to a high forward position, such that sight the line moving angle 34 between a sight line 35 connecting the driver's eyes to the display means and a sight line 31 connecting the driver's eyes to a target 20 can be suitably decreased.

However, because the display means 41 after movement obstructs the driver's field of view in the vicinity of a vehicle body, in case where the vehicle is preferably driven on a road having a lot of targets 21 near the vehicle body, it is suitably required that the display means 41 after movement should be preferably returned to its initial position 41a so as to secure the driver's field of view near the vehicle body. That is, preferably, in certain embodiments, the display means 41 is preferably configured in a movable fashion such that it is moved to a position suitably corresponding to the driving condition of the vehicle.

Because the angle of view of the human eye in a substantially horizontal direction is suitably larger than that of the human eye in a substantially vertical direction, in certain embodiments, the horizontal position of the display means 4 does not matter relatively as compared to the vertical position thereof. For this reason, it is preferable in certain embodiments that the horizontal position (initial position) of the display means 4 can be set comparatively diversely even in a vehicle which is used currently.

Accordingly, in examples where a driver must concentrate on driving because a considerable number of obstacles are on a road, for example, but not limited to, a case where a vehicle is driven at high speed and for example, simultaneously the traffic volume is high, when the display device 40 is preferably positioned in front of the driver 30, the sight line moving angle 33 of the driver is considerably small. However, because the angle of view of the driver's eyes in a substantially horizontal direction is large, if the position of the display means 4 is within a predetermined range, for example, a range from the driver to a central line of the vehicle, preferably the stability of driving is not degraded despite movement of the display device 40.

In other preferred embodiments, the vehicle is driven on a motor road or the like where there are fewer obstacles in the surroundings, for example the area surrounding the vehicle, particularly, in further embodiments, where a fellow passenger is seated next to the driver, the driver 30 may drive while taking a posture of slightly spreading his or her body from a central portion of the vehicle body toward the passenger side front seat. In such a situation, the driver can preferably move the display means 4 suitably towards the central portion of the vehicle so as to easily recognize the display means 4.

In other further embodiments, in examples where light emitted from a headlight of a rear vehicle is reflected from the display means 4 to cause the drivers eyes to be dazzled or affected, for example in a negative manner, by the reflected light, the driver can preferably change the horizontal position of the display means 4 so as to suitably avoid the reflection of light from the headlight.

Accordingly, preferably, the horizontal position of the display means 4 is set arbitrarily within a suitable predetermined range according to the condition of the vehicle or the driver's desire.

According to preferred embodiments, the limit of the movement distance of the display means 4 in the perspective direction of the display means 4 is preferably substantially just below the front windshield glass, and the limit of the movement distance of the display means 4 in a vertical direction is preferably from the initial position 41*a* to a suitable position above the dashboard (i.e., preferably a state where the display means is suitably mounted on the dashboard). In further embodiments, the limit of the display means 4 in a horizontal direction is from the front of the driver to a central line of the vehicle.

A further embodiment of the invention features a control of the rotation angle about a vertical axis of display means and the rotation angle about a horizontal axis of display means directly oriented toward an advance direction.

Preferably, the display means is oriented toward a driver's head at an initial position 41*a,* but is preferably not oriented toward the driver's head after its movement.

In other preferred embodiments, the rotation angle (hereinafter, referred to as "angle") about a substantially vertical axis of the display means and the rotation angle (hereinafter, referred to as "angle") about a substantially horizontal axis of the display means directly oriented toward an advance direction after movement of the display means are preferably oriented toward the driver's head in terms of awareness.

Figure 2:
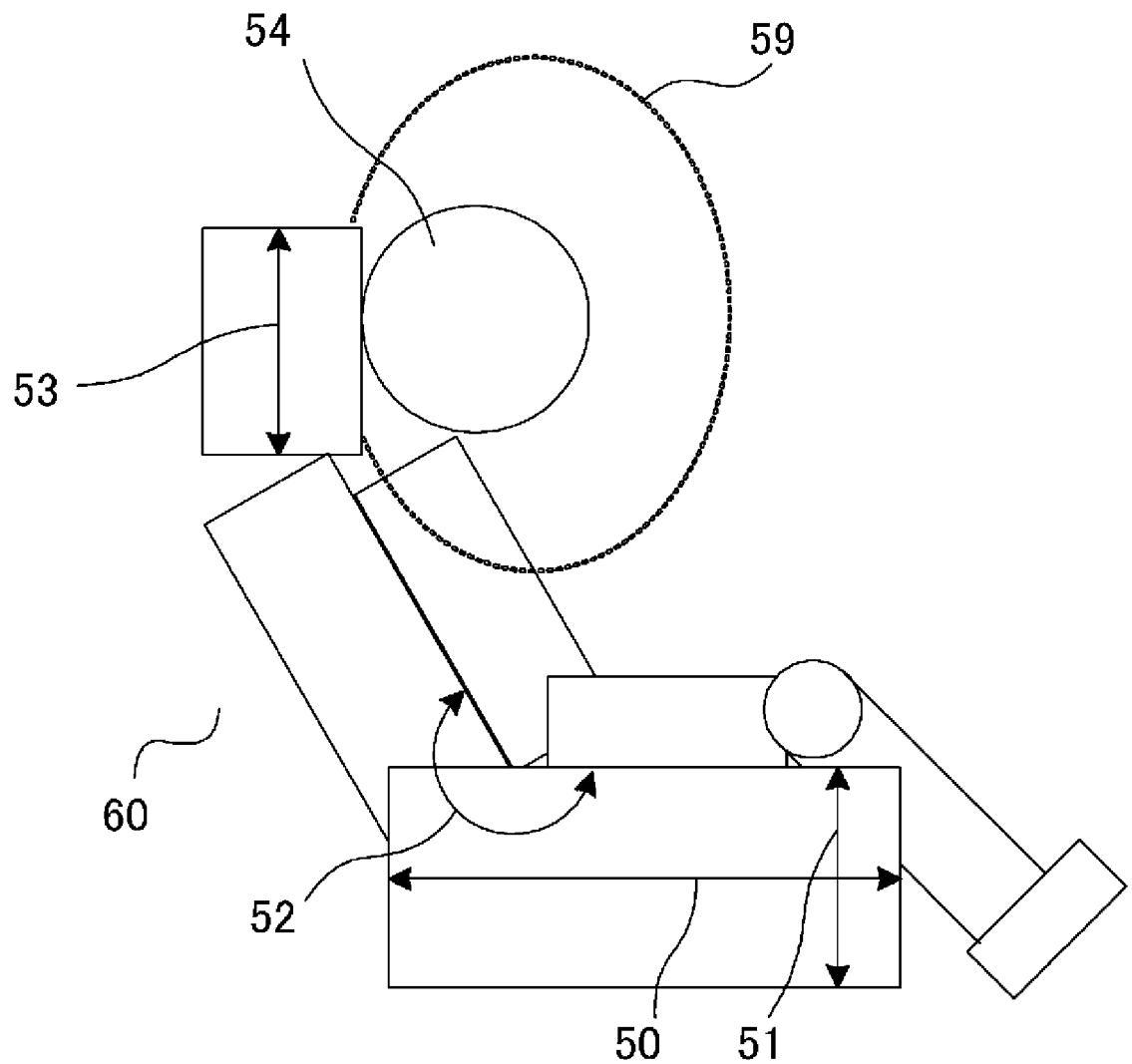
FIG. 2 is a schematic diagram illustrating a method of detecting a driver's head.

FIG. 2 is a schematic diagram illustrating a power seat according to preferred embodiments of the invention The power seat, preferably, when viewed from a side of the vehicle wherein the right of the drawing is the advance direction of the vehicle.

Preferably, the power seat 60 refers to a driver's seat which can be suitably adjusted in, for example any one of but not only limited to, the front and rear position 50 of the seat, the height 51 of the seat, the angle 52 of a back seat and the height 53 of a head rest, suitably by means of a motor installed inside the seat. According to further embodiments, the position movement of the movable display device is suitably detected by a position sensor, and is preferably stored in a vehicle condition-collecting means 3. Preferably, the control means 5 detects a range of driver's head suitably based on the position data of the head rest and determines the front of the head rest as the driver's head.

In other further embodiments of the invention, the control means 5 controls the driver's head 54 to be suitably oriented toward the display means 41 after movement so as to calculate the angle and adjust the angle of the display means 41 after movement, which results in improvement of awareness of the display means 41.

Figure 3:
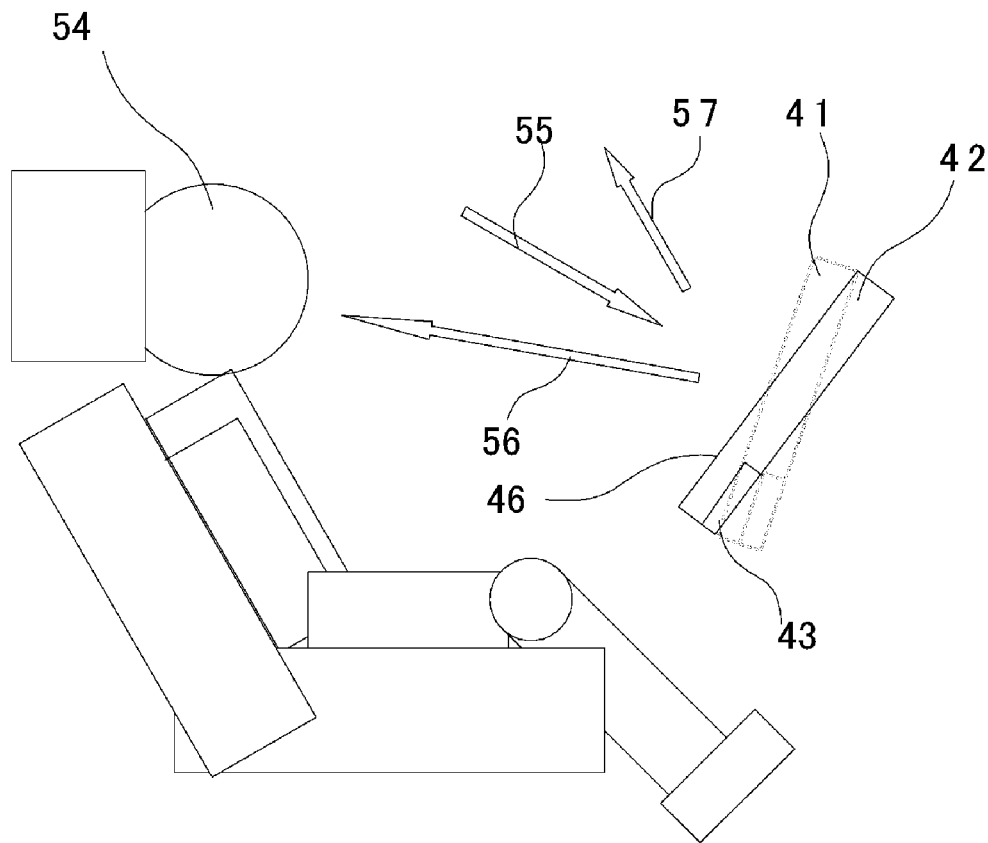
FIG. 3 is a schematic diagram illustrating a reflected light of a solar beam and an angle change of display means.

FIG. 3 is a schematic diagram illustrating the incidence of a solar beam to the display means and the reflection of the solar beam from the display means.

According to preferred embodiments of the invention, when the reflected light of the solar beam is incident to the driver's head, the angle of the display means after movement is preferably adjusted lest the reflected light of the solar beam should be incident to the driver's head.

Referring to FIG. 3, the solar light 55 incident to the display means 4 can be suitably detected by luminance measurement means 43 preferably included in the display means 41 after movement.

According to further preferred embodiments, the vehicle condition-collecting means 5 collects position information of a vehicle including, but not limited to, a latitude, a longitude, an altitude, a driving angle and a tilt of the vehicle body during the driving of the vehicle using, for example, but not only limited to, GPS, geomagnetic sensor, gyroscope or the like. Also, in other embodiments, the vehicle condition-collecting means 5 preferably collects information on whether the solar light is incident to the display means 42 after angle change suitably from the luminance measurement means mounted in the display means.

Preferably, the control means 5 detects the incident angle of the solar light to the display means 42 after angle change based on the altitude and azimuth information of the sun. Accordingly, when it is determined that the reflected light 56 is suitably irradiated to the driver's head, the control means 5 suitably adjusts the angle of the display means 42 after angle change so as to allow the reflected light 57 after angle change of the display means to escape from the driver's head 54. In further embodiments, and shown in FIG. 3, there is shown an example where the reflected light 57 after angle change of the display means is suitably deviated upwardly from the driver's head, however it is preferred according to embodiments of the invention as described herein that the direction in which the reflected light 57 is deviated is not limited particularly.

The invention also features in further embodiments the construction of a display device.

In further embodiments, the movable display device of the present invention preferably includes vehicle condition-collecting means, display means and control means.

Figure 4:
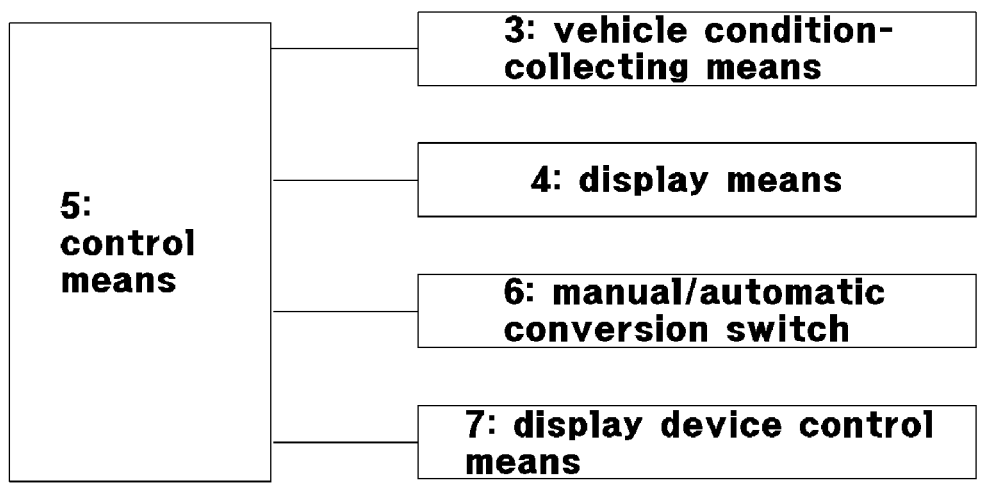
FIG. 4 is a block diagram illustrating the construction of a movable display device according to the present invention.

FIG. 4 is a block diagram illustrating the construction of a movable display device according to preferred embodiments of the present invention.

As described above, the control means 5 preferably controls the position and angle of the display means 4 that suitably displays the driving condition of the vehicle based on information collected by the vehicle condition-collecting means 3.

According to preferred embodiments, the control means preferably 5 includes, but is not only limited to, means for suitably controlling the position of the display means 4, means for suitably controlling the change of a display content and/or a display screen configuration, and a manual/automatic conversion switch preferably for manually selecting an on/off state. In preferred embodiments, the manual/automatic conversion switch 6 allows the driver 30 to select any one of automatic and manual functions of the display device 1. In addition, in preferred embodiments, means for suitably controlling the angle of the display means 4 is always in an ON state.

In further preferred embodiments, the movable display device of the present invention includes display device control means 7 for manually controlling the position of the display means 4 so that the driver can preferably move the display means 4 to an arbitrary position within a suitable movable range.

The invention also features in other preferred embodiments, vehicle condition-collecting means 3.

Preferably, the vehicle condition-collecting means 3 suitably includes sensing means for detecting the driving condition of the vehicle and calculating means composed of a partial or independent calculating unit of a central control device, and suitably serves to collect data on the driving condition of the vehicle.

Preferably, the data on the vehicle condition may include, but is not limited to, the velocity of a vehicle, the number of revolutions of the engine, the temperature of cooling water, the quantity of cooling water, the amount of fuel available, the driving distance, the total driving distance, etc. In related embodiments, the data obtained from the sensing means for detecting the condition of a vehicle body 10 is preferably converted into a digital data by a given method and is input to the calculating means of the vehicle condition-collecting means 3.

In other further embodiments, the vehicle condition-collecting means may include information-collecting means arbitrarily mounted in the vehicle such as, but not limited to, a gyroscope, an acceleration monitoring system or the like Preferably, the vehicle condition in the present invention includes the condition of a passenger and the interior of the vehicle, for example, a step of suitably detecting the driver's head 54 estimated from the installation position data of the power seat 60.

Preferably, in certain embodiments, the vehicle condition may include a road condition. The road condition may include, but is not only limited to, road and traffic information that can be suitably based on information obtained from a navigation system, and information on the position and the advance direction of the vehicle that can be suitably obtained by using the GPS or the gyroscope.

Certain other preferred embodiments of the invention also feature a Control means.

According to preferred embodiments of the invention described herein, the control means 5 is preferably included in the movable display device of the present invention as a part of the central control device of the vehicle, or is suitably an independent computer system. The control means 6 in certain preferred embodiments, performs a calculation process according to a preinstalled program by preferably referring to data transmitted from the vehicle condition-collecting means 3 to suitably determine whether to perform a control operation.

In preferred embodiments, if the control means 5 determines that the control operation is needed, it suitably controls the optimal position and angle, the display content and/or the display screen configuration of the display means 4 according to a suitably preinstalled control pattern.

The invention also features in other preferred embodiments a Display means.

Preferably, the display means 4 serves to suitably display the vehicle condition thereon according to an instruction of the control means 5. According to preferred embodiments, the display means 4 may be, but is not only limited to, a mechanical meter or a liquid crystal display. In certain embodiments, the display means 4 is more preferably used in order to change the display content to display the optimized display content and/or display screen configuration thereon. In preferred embodiments, for example in the case of both the mechanical meter and the liquid crystal display, a stepping motor can be driven in response to a control signal of the control means 5 to cause the display means to be suitably moved in the front/rear, up/down and left/right direction or the angle of the display means to be changed.

The invention features in further embodiments, methods of controlling the position of the display means.

Figure 5:
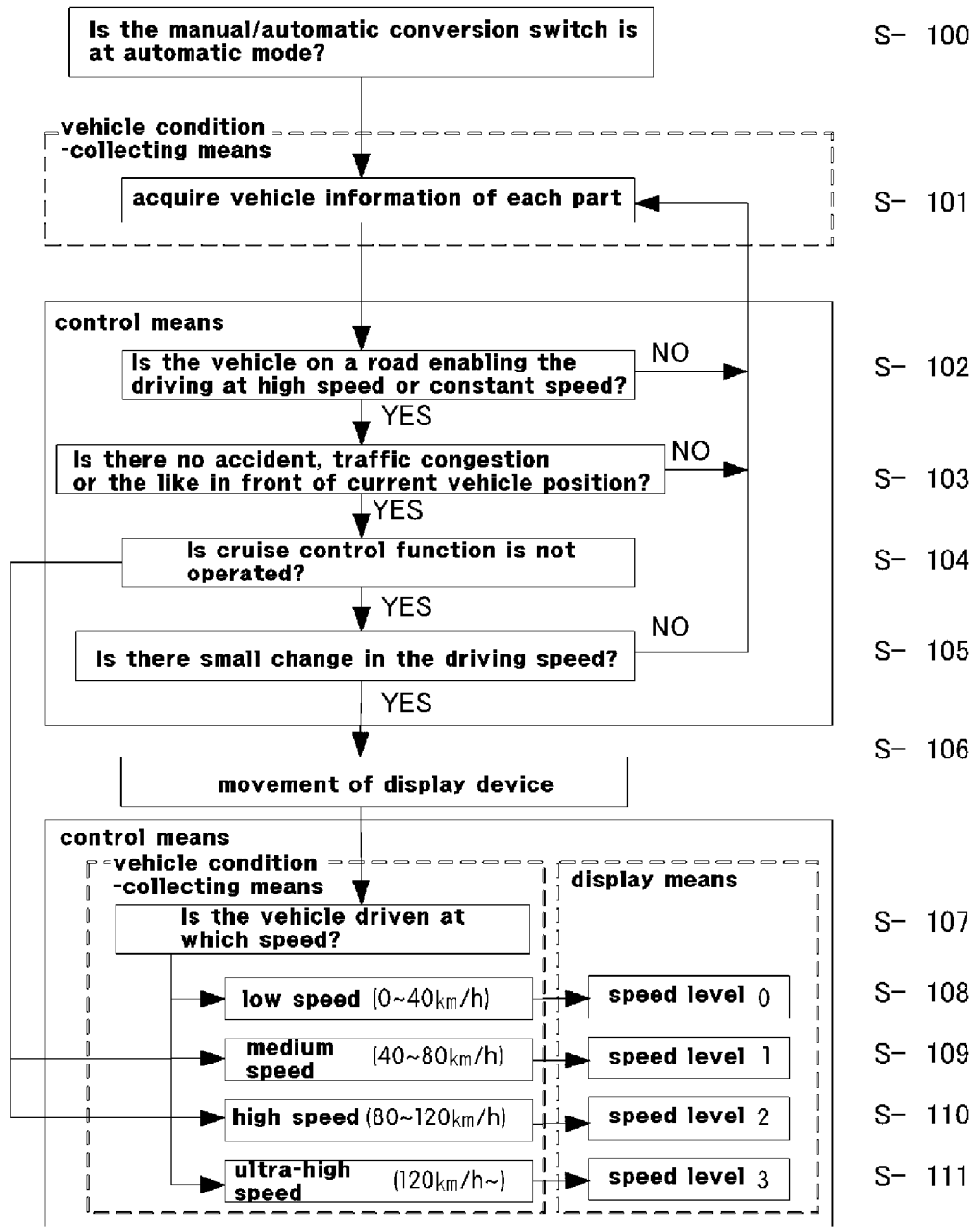
FIG. 5 is a flowchart illustrating a method in which control means controls the position of the display means.

FIG. 5 is a flowchart illustrating an exemplary method in which the control means 5 controls the position of the display means 4.

For example, referring to FIG. 5, when the manual/automatic conversion switch 6 is preferably turned on (S-100), the control means 5 acquires information from the vehicle condition-collecting means 3 (S-101).

Accordingly, in further embodiments, the control means 5 determines, for example, whether a vehicle being driven is on a road where the vehicle can be driven at suitably high speed or a suitably constant speed (S-102), whether there is any accident, traffic congestion or the like in front of the current vehicle position (S-103), whether the cruise control function of the vehicle is operated (S-104), and whether there is a small change in the driving speed (S-105). According the preferred embodiments, if it is suitably determined that the answer to all the above questions is YES, the control means 5 determines that the vehicle is driven on a road having no obstacle at constant speed, and hence the program proceeds to a step (S-106) where the control means suitably controls the display means 4. In other embodiments, if it is determined that the answer to any one of the questions is No, the control means 5 does not suitably perform the movement of the display means 4 but the program returns to the step (S-101).

Preferably, at step (S-106) of controlling the display means 4, the control means 5 suitably detects the driving speed of the vehicle by preferably dividing the driving speed of the vehicle into a plurality of speed levels (S107). Preferably, the control means 5 controls the display means 4 according to a suitably preset control pattern corresponding to each speed level.

In the preferred embodiment shown in FIG. 5, the control means 5 suitably detects the driving speed of the vehicle by dividing the driving speed of the vehicle into a suitably low speed less than 40 km/h (S-108), a suitably medium speed of 40-80 km/h (S-109), a suitably high speed of 80-120 km/h (S-110), and a suitably ultra-high speed of more than 120 km/h (S-111), and thus preferably allows the divided driving speeds to correspond to speed levels 0 to 3, respectively. Preferably, the speed level 0 is an initial value in which the control function is not performed. The setting of the speed level of the present invention is accordingly not limited thereto.

In further embodiments, in examples where the cruise control function of the vehicle is suitably operated, the program preferably proceeds to steps (S-109 and S-110).

Preferably, the control pattern corresponding to the speed levels 0 to 3 is previously input to the control means 5.

According to certain preferred embodiments of the invention, the control means 5 preferably selects the control pattern based on the speed level selected by the vehicle condition-collecting means 3, and suitably moves the display means 4 correspondingly to the selected control pattern.

Figure 6:
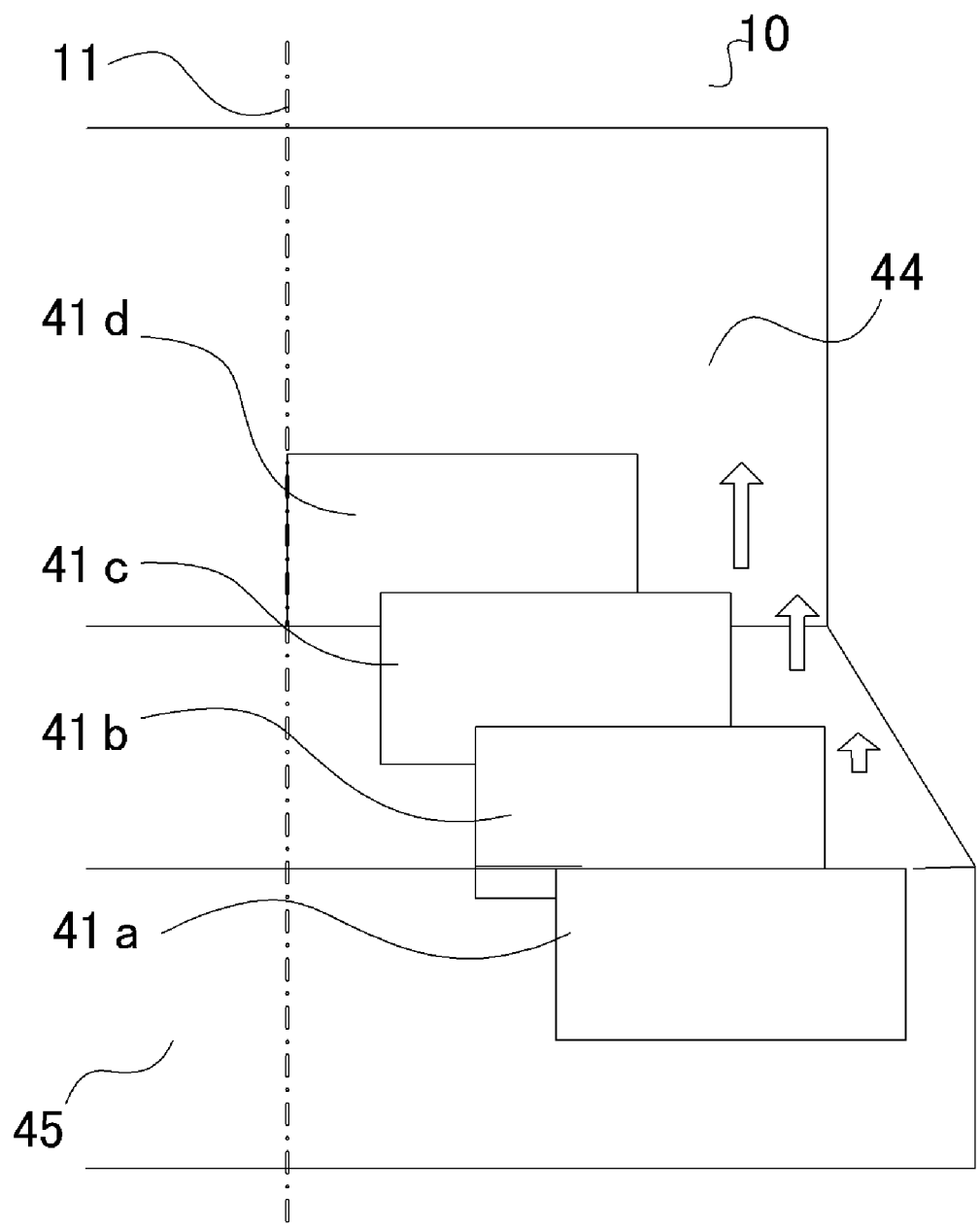
FIG. 6 is a schematic diagram illustrating a control pattern of the display means according to one embodiment of the present invention.

FIG. 6 is a schematic diagram illustrating a control pattern of the display means according to one embodiment of the present invention.

Referring to FIG. 6, the control pattern is preferably set in such a fashion that the display means 4 is preferably stepwise moved from an initial position 41a to a suitably high position in front of the vehicle body 10 correspondingly to an increase in the driving speed of the vehicle.

The invention features in preferred embodiments, methods of changing and modifying the angle of the display means.

In preferred embodiments, the control means preferably detects the driver's head 54 from the position data of the power seat 60 and suitably changes the angle of the display means 41 after movement in such a fashion that the display means is suitably oriented toward the driver's head 54.

Preferably, by changing the angle of the display means 41 after movement, when the reflected light 56 of the solar beam is incident to the driver's head 54, the control means 5 suitably adjusts the angle of the display means 4 lest the reflected light 56 of the solar beam should be incident to the driver's head 54.

Figure 7:
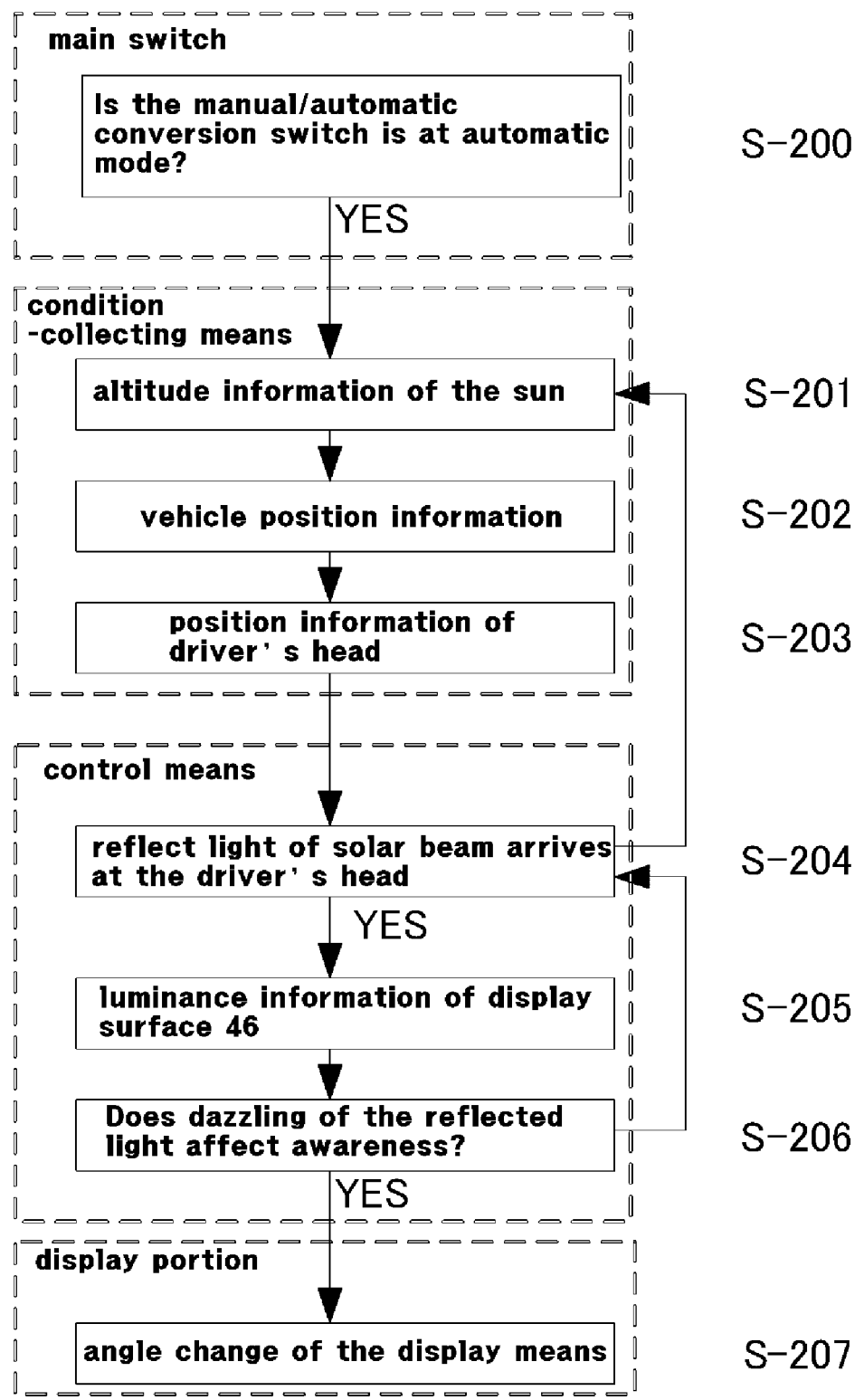
FIG. 7 is a flowchart illustrating a method in which the control means adjusts the angle of the display means.
Figure 8:
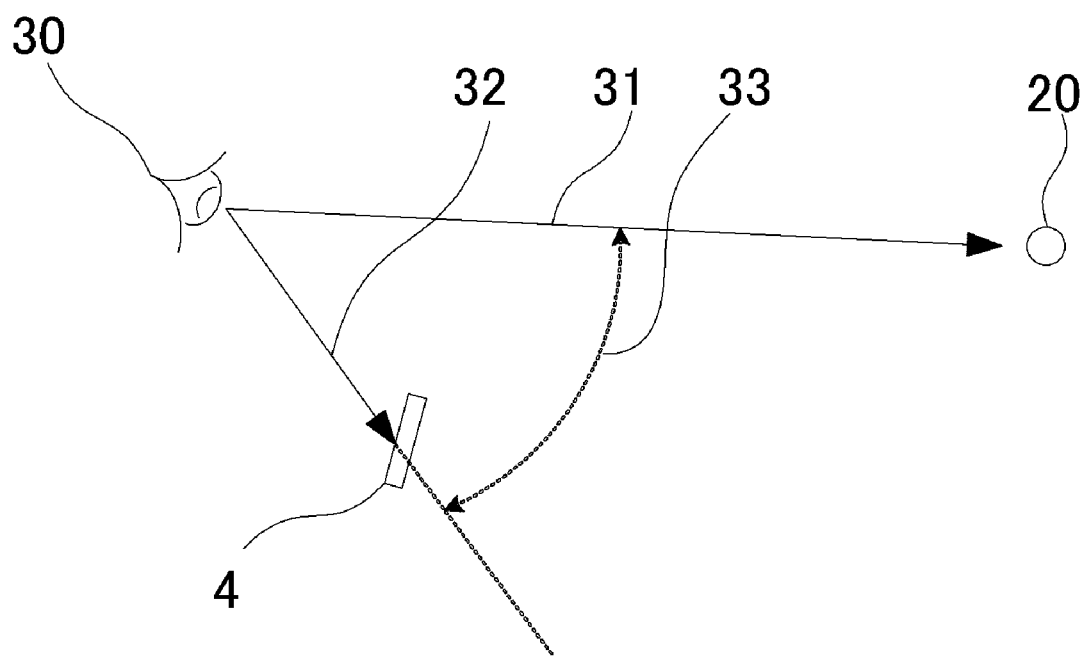
FIG. 8 is a schematic diagram illustrating the relationship between a position of display means and a sight line moving angle according to the prior art.

FIG. 7 is a flowchart illustrating a method in which the control means adjusts the angle of the display means 4.

Referring to FIG. 7, preferably, when the manual/automatic conversion switch 6 is turned on (S-200), the control means 5 suitably acquires information from the vehicle condition-collecting means 3.

In preferred embodiments, the control means 5 suitably estimates the altitude position of the sun during the driving of the vehicle based on the altitude and azimuth information of the sun stored in the vehicle condition-collecting means 3 (S-201), acquires vehicle position information including, for example, the altitude, the longitude and the altitude, and the angle of the driving direction and the tilt of the vehicle during the driving of the vehicle using, for example, the GPS, the geomagnetic sensor, the gyroscope or the like (S-202), and estimates the driver's head 54 based on data of the position sensor of a power seat operating portion (S-203).

According to preferred embodiments, the control means 5 determines whether the reflected light 56 of the solar beam arrives at the driver's head 54 (S-204) based on the data (S-201 to 203). Preferably, if it is determined that the reflected light 56 of the solar beam arrives at the driver's head 54, the control means suitably refers to the luminance of the solar light stored in the vehicle condition-collecting means 3 in case of the display means 42 after angle change (S-205). If it is determined that the dazzling or shining of the reflected light 56 affects awareness of the display means 42 after angle change (S-206), the control means 5 suitably changes the angle of the display means 42 to cause the reflected light 57 after the angle change of the display means not to be incident to the driver's head 54 (S-207).

The invention also features in preferred embodiments, change of display content and/or display screen configuration of the display means.

In preferred embodiments, as the display means 4 is moved from the initial position 41*a* to a position suitably far away from the driver 30, the display content of the display means 4 is preferably changed to improve awareness of the information.

Preferably, the display means 4 is configured such that the display content and/or the display screen configuration can be suitably changed within a display-enabling region. Accordingly, the change of the display screen configuration secures awareness of the display means by changing the size, brightness and color of a character or a figure.

In certain embodiments, when information which is relatively frequently identified depending on the vehicle condition, there may be an example where the information is suitably positioned at a position where the sight line moving angle 33 is substantially large, or there may occur the case where any unimportant display content is always displayed on the display means. According to preferred embodiments of the present invention, the content or arrangement of the information is optimized depending on the driving condition of the vehicle so as to make the sight line moving angle 33 substantially small to thereby promote improvement of the awareness of the display means according to the optimization of the information.

According to preferred embodiments of the invention, the change of the display content and/or the display screen configuration of the display means 4 can be suitably carried out by the control means 5. The display content and/or the display screen configuration is preferably controlled based on a display pattern included in a preset control pattern stored in the control means 5. According to preferred embodiments, if the display pattern is previously set and stored in the control means 5, it is possible to move the display means 4 and simultaneously change the display content and/or the display screen configuration of the display means.

Accordingly, at least one selected from, but not only limited to, the size, the color tone, the luminance (contrast) of a display content within a display screen can be changed depending on the need and taste of the driver 30. Preferably, in further embodiments, each of the listed items may be changed manually and independently.

Table 1 illustrates the preferred display pattern of each speed level according to preferred embodiments of the present invention. In a manner in which a character or an object is suitably viewed, it is generally known that a hot or vivid color such as red, orange, yellow and the like is seen larger than a cool or less vivid color such as blue, violet, green and the like, and a dark color is seen larger than a bright color.

TABLE 1

| | | Driving speed of vehicle | | | |
|---|---|---|---|---|---|
| | | Low speed (below 40 km/h) | Medium speed (40-80 km/h) | High speed (80-120 km/h) | Ultra-high speed (above 120 km/h) |
| Display position | Vertical direction | Low | Medium | High | High |
| | Perspective direction | Near | Medium | Far | Far |
| | Horizontal direction | Front of driver | Near center side | Center side | Center side |
| | Sight line moving angle distance | Level 0 (initial position) | Level 1 (small) | Level 2 (medium) | Level 3 (large) |
| Visual property of human eye | Understandable information amount | Much | Medium | Less | Less |
| | Focal distance | Near | Medium | Far | Far |
| | Range of field of view | Wide | Medium | Narrow | Narrow |
| Color tone of display means | Color | Cool color | ← → | | Hot color |
| | Luminance | Dark | ← → | | Bright |
| | Size | Small | ← → | | Large |

As described above, the movable display device of the present invention preferably allows the display means to be moved to a high position in front of a vehicle body during the stable high-speed traveling of the vehicle so as to suitably reduce the sight line moving angle, thereby alleviating the driver's fatigue.

In further embodiments, the movable display device of the present invention allows the display means after its position movement to be preferably oriented toward the drivers head so as to suitably enhance awareness of the display means, thereby mitigating the driver's fatigue.

In addition, the movable display device of the present invention allows the angle of the display means to be adjusted even under the condition where solar light is reflected from the display means so as to prevent the reflected light from reaching the driver's eyes to secure excellent awareness of the display means, thereby lessening the driver's fatigue.

As described herein, the movable display device of the present invention optimizes a display content or a screen configuration to suitably correspond to the driving condition of the vehicle so as to increase awareness of the display means, thereby reducing the driver's fatigue.

The invention has been described in detain with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A movable display device comprising display means for displaying a driving condition of a vehicle, vehicle condition-collecting means for collecting information regarding the driving condition of the vehicle and control means for controlling the display means,
   wherein the display means is movable in a horizontal direction from a side of a dashboard to a center of the vehicle, in a perspective direction from the dashboard side to a position just below a front windshield glass, and in a vertical direction from the dashboard side to a position above the dashboard, the position of the display means being configured by the control means,
   wherein the display means is configured such that the rotation angle about a vertical axis of the display means and the rotation angle about a horizontal axis of the display means directly oriented toward an advance direction are changeable, and the rotation angle about a vertical axis of the display means and the rotation angle about a horizontal axis of the display means directly oriented toward an advance direction are set by the control means, and
   the vehicle condition-collecting means detects a driver's head through a position sensor mounted at a motor-driven driver's seat, the control means controls the rotation angle about a vertical axis of the display means after movement and the rotation angle about a horizontal axis of the display means directly oriented toward an advance direction to be changed in such a fashion as to be oriented toward the driver's head.

2. The movable display device of claim 1, wherein the control means perceiving driving speed of the vehicle in a manner of dividing the driving speed of the vehicle into a plurality of speed levels, determines the position of the display means according to a preset control pattern corresponding to each speed level, and controls the display means to be moved.

3. The movable display device of claim 2, wherein the control pattern is set in such a fashion that the display means is stepwise moved from the dashboard side to a position above the dashboard of the vehicle body correspondingly to an increase in the driving speed of the vehicle.

4. The movable display device of claim 1, wherein the vehicle condition-collecting means further comprises means for detecting the altitude, the longitude and the altitude, the angle of the driving direction and the tilt of the vehicle, and whether the solar light is incident to the driver's head, and
   the control means integrates vehicle position information which can be obtained by the altitude, the longitude and the altitude, the angle of the driving direction and the tilt of the vehicle, altitude and azimuth information of the sun which can be obtained from the celestial movement table, information on whether the solar light is incident to the driver's head, information on the position of the display means after angle change, and information on the rotation angle about a vertical axis of the display means and the rotation angle about a horizontal axis of the display means directly oriented toward an advance direction so as to detect the angle of the reflected light of the solar beam from the display means after angle change to change the rotation angle about a vertical axis of the display means after angle change and the rotation angle about a horizontal axis of the display means directly oriented toward an advance direction so that the reflected light is incident to a position beyond a range of the driver's head.

5. The movable display device of claim 1, wherein the display means is a mechanical meter or a liquid crystal display.

6. The movable display device of claim 5, wherein the display means is configured such that the display content and/or the display screen configuration can be changed within a display-enabling region.

7. The movable display device of claim 6, wherein the display content and/or the display screen configuration of the display means is controlled by the control means.

8. The movable display device of claim 7, wherein at least one selected from the size, the color tone and the luminance (contrast) of the display content and/or the display screen configuration of the display means is changeable manually and independently.

9. The movable display device of claim 1, wherein the display means is manually movable to an arbitrary position within a movement-enabling range, 10. A movable display device comprising
    display means for displaying a driving condition of a vehicle,
    vehicle condition-collecting means for collecting information regarding the driving condition of the vehicle and
    control means for controlling the display means,
    wherein the display means is configured such that the rotation angle about a vertical axis of the display means and the rotation angle about a horizontal axis of the display means directly oriented toward an advance direction are changeable, and the rotation angle about a vertical axis of the display means and the rotation angle about a horizontal axis of the display means directly oriented toward an advance direction are set by the control means, and
    the vehicle condition-collecting means detects a driver's head through a position sensor mounted at a motor-driven driver's seat, the control means controls the rotation angle about a vertical axis of the display means after movement and the rotation angle about a horizontal axis of the display means directly oriented toward an advance direction to be changed in such a fashion as to be oriented toward the driver's head.

11. The movable display device of claim 10, wherein the display means is movable in a horizontal direction, in a perspective direction, or in a vertical direction.

12. The movable display device of claim 11, wherein the display means is movable in a horizontal direction from a side of a dashboard to a center of the vehicle, in a perspective direction from the dashboard side to a position just below a front windshield glass, or in a vertical direction from the dashboard side to a position above the dashboard, the position of the display means being configured by the control means.

13. A motor vehicle comprising the movable display device of claim 1.

14. A motor vehicle comprising the movable display device of claim 10.

* * * * *